May 8, 1962 J. W. KLEMMER 3,032,876
POWER DRIVEN SHEAR
Filed Aug. 4, 1960
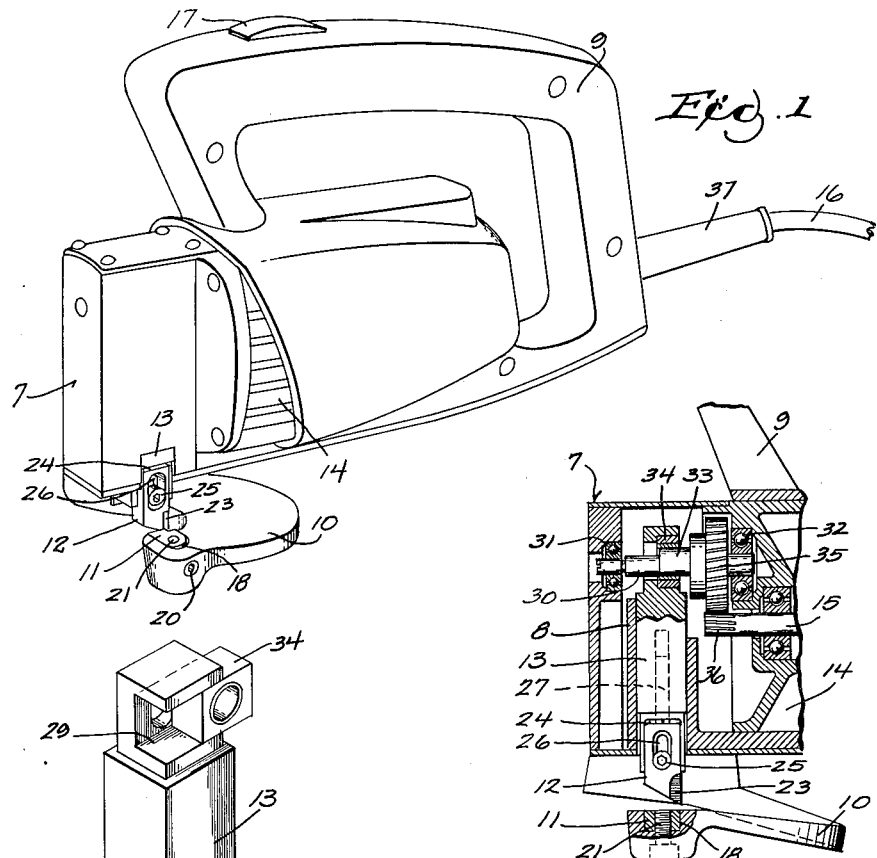
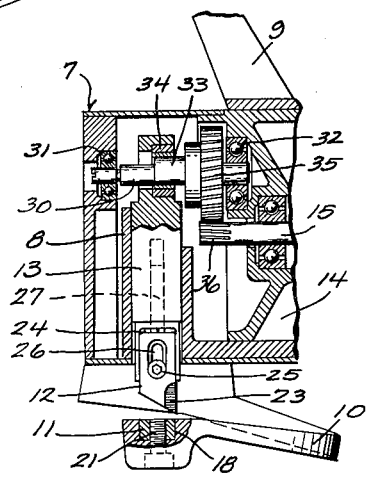
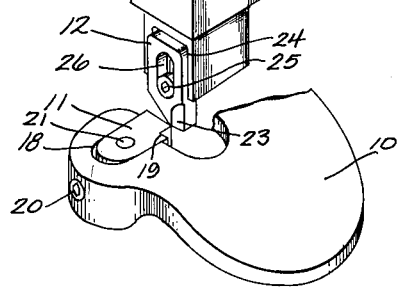
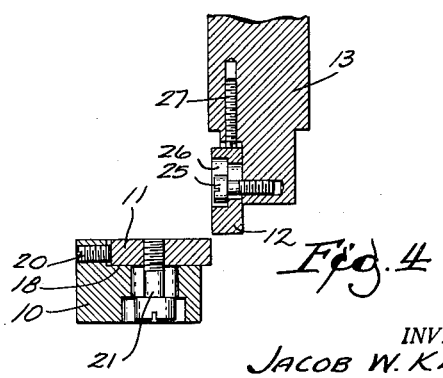
INVENTOR.
JACOB W. KLEMMER
BY
Lieber, Lieber & Nilles
ATTORNEYS United States Patent Office
3,032,876
Patented May 8, 1962

1

3,032,876
POWER DRIVEN SHEAR
Jacob W. Klemmer, Milwaukee, Wis., assignor to Milwaukee Electric Tool Corporation, Milwaukee, Wis., a corporation of Wisconsin
Filed Aug. 4, 1960, Ser. No. 47,558
3 Claims. (Cl. 30—241)

This invention relates generally to improvements in the art of cutting sheet material, and it relates more specifically to improvements in the construction and operation of power driven shears of the type having a reciprocable blade cooperating with a normally fixed blade.

This application is a continuation-in-part of abandoned application Serial No. 855,908, filed November 27, 1959, and the primary object of the present invention is to provide a power driven shear which is simple and compact in structure and highly effective in use, and in which the shearing blades cooperate at high speed and with minimum wipe.

Some of the more important specific objects of the invention may be defined as follows:

To provide a shear assemblage especially adapted to produce a smooth cut when severing tenaceous sheet material along curved or irregular lines.

To provide a portable shear unit capable of cutting relatively heavy sheet metal or the like without creating objectionable burrs along the severed edges.

To provide a durable power driven shear comprising relatively movable cutting blades which are conveniently adjustable to sever sheet materials of different thicknesses with utmost efficiency and precision.

To provide a manually propelled shear having a fixed cutting blade cooperating with a reciprocable power driven blade, and wherein the latter is driven at high speed and has a cutting edge which only slightly overlaps that of the fixed blade but effectively guides the shears while advancing along the work.

To provide a portable compact motor driven shear assembly in which the manual propelling force is applicable in close proximity to the work thus insuring maximum accuracy in cutting.

To provide a simple and highly attractive power driven shear tool which is readily operable and manipulable with utmost safety to perform diverse types of work.

These and other more specific objects and advantages of the invention will be apparent from the following detailed description.

A clear conception of the features constituting the present improvement, and of the construction and operation of a commercial portable power driven shear embodying the invention, may be had by referring to the drawing accompanying and forming a part of this specification wherein like reference characters designate the same or similar parts in the various views.

FIG. 1 is a perspective view of a typical electric motor driven portable shear incorporating the invention, having the movable blade cutting edge slightly overlapping that of the fixed blade and looking toward the cutting zone;

FIG. 2 is an enlarged central vertical section taken through the cutting zone of the machine along a plane disposed parallel to the path of advancement of the tool along the work, and showing the movable blade at the upper end of its stroke;

FIG. 3 is a further enlarged partially exploded perspective view of a fragment of the work supporting and fixed blade carrying the yoke, and of the movable blade supporting ram with its actuating block at mid-stroke, also looking toward the cutting blades; and FIG. 4 is a fragmentary likewise enlarged vertical section taken through the cutting zone and blades along a plane disposed perpendicular to the path of advancement

2 of the unit along the work and passing centrally through both blades.

While the invention has been shown and described as having been embodied in an electric motor driven portable unit having a normally fixed cutting blade cooperable with a rapidly reciprocable blade, it is not intended to restrict the use of all of the improved features to such an assemblage; and it is also contemplated that specific descriptive terms employed herein be given the broadest possible interpretation consistent with the disclosure.

Referring to the drawing, the portable shear shown therein comprises in general, a main casing 7 provided at one end with a downwardly open internal guide channel 8 having polygonal transverse cross-section, and being connected at its opposite end to a hollow handle 9 which extends over the casing top to a point directly above the channel 8; a material supporting yoke 10 secured to the casing 7 in close proximity to the open lower end of the channel 8; a normally fixed cutting blade 11 adjustably mounted on the yoke 10; a movable cutting blade 12 adjustably attached to the lower end of a ram 13 reciprocable within the channel 8, and having an inclined cutting edge cooperable with the normally horizontal cutting edge of the fixed blade 11 to effect shearing of sheet-material engaged by the yoke 10; driving mechanism coacting with the upper end of the ram 13 within the casing 7 for rapidly reciprocating the ram and the movable blade 12; an electric motor 14 also housed within the casing 7 and having a power shaft 15 for actuating the ram driving mechanism; and current conductors 16 for energizing the motor 14 extending through the hollow handle 9 and having a motor control switch 17 therein exposed for actuation through the handle grip.

Since the unit is portable, the major portion of the casing 7 is preferably formed of light but durable material in order to facilitate manipulation, and the cooperating fixed and movable blades 11, 12 are of special construction and relatively adjustable so as to insure clean cutting and most effective cooperation while shearing sheet material of different thickness. The yoke 10 is bifurcated and has one arm firmly attached to the casing 7 and its opposite arm provided with a recess 18 in which the fixed blade 11 is confined for adjustment toward or away from the plane of cutting, while the intermediate bend of the yoke is offset and has slightly diminishing thickness approaching the fixed blade 11 as shown in FIG. 2. With the tool disposed in upright position as illustrated in the drawing, the cutting edge of the blade 11 lies in an approximately horizontal plane and the trailing side of this blade is provided with a notch 19 as depicted in FIGS. 1 and 3; and the blade 11 may be adjusted relative to the vertical plane of the cut by means of an adjusting screw 20 cooperating with a locking screw 21 to hold it in adjusted position, see FIGS. 1, 3 and 4.

Both of the blades 11, 12 are formed of tool steel, and the movable blade 12 has a cutting edge inclined relative to the horizontal plane of the cutting edge on the fixed blade 11 and is provided with a flat surface 23 which is inclined laterally away from the vertical plane of cutting as shown in FIGS. 1, 2 and 3. This flat surface 23 is located beyond the trailing ends of the cutting edges of the blades 11, 12 and cooperates with the notch 19 in the blade 11 to guide the sheet material being cut while advancing along curves and to eliminate burrs from the severed edges especially when cutting along curved or irregular lines. The movable blade 12 is slidably adjustably confined within a vertically elongated slot 24 in the lower end of the ram 13 by a locking screw 25 disposed within an elongated recess 26 in the movable blade, and adjustment of the blade 12 relative to its carrying ram may be effected by removing the movable blade 12 and by thereafter turning the screw 27 with the aid of a screw driver applied to its lower slotted end, to vary the position of this stop screw 37 which coacts with the upper end of the movable blade, see FIGS. 2 and 4. The adjustment of either blade 11, 12 may be made independently of and without disturbing the other blade since the stop screw 27 is accessible upon removal of the blade 12 through the bifurcation of the yoke 10.

The ram 13 which is snugly but slidably confined within the channel 8 of the casing 7, and to the lower end of which the blade 12 is secured, has its upper end provided with a transverse guideway 29 with which the motion transmitting mechanism connected to the power shaft 15 of the motor 14, coacts. As shown in FIG. 2, this mechanism comprises in general a counter shaft 30 having its opposite ends journalled in anti-friction bearings 31, 32 mounted in the casing 7 while its medial portion is provided with an eccentric 33 coacting with a cross-head 34 which is slidable within the guideway 29; and a helical gear 35 secured to the medial portion of the shaft 30 adjacent to the bearing 32 and meshing with a pinion 36 at the end of the motor shaft 15 as illustrated in FIG. 2. The outer end of the counter shaft 30 is provided with a slot to which a screw driver may be applied when adjusting the blade 12, and the eccentric 33 which is revolvable at high speed has only slight throw which determines the stroke of the ram 13. The electrical current conductors 16 extend through a protective bushing 37 and through the hollow handle 9 up to the control switch 17 and from this switch also extends through this handle to the high speed motor 14, and the casing 7 is provided with readily removable parts for effecting convenient assembly or dismantling of the unit.

When the various parts of the shear have been properly constructed and assembled as above described and the tool is about to be applied to sheet material of definite thickness or gauge, the fixed blade 11 should first be adjusted with the aid of the screws 20, 21 to effectively cooperate with the thickness of the material which is to be cut; and the movable blade 12 should also be adjusted with the aid of the screws 25, 26 so that when the ram 13 is midway between the ends of its stroke, the lower point of the inclined cutting edge of this blade 12 will lie approximately in the plane of the cutting edge of the blade 11 while the extreme lowermost portion of the laterally inclined surface 23 of the movable blade extends downwardly below this plane, as illustrated in FIG. 3. Such setting of the blades 11, 12 is important and must be effected only when sheet material of different thickness is to be cut or when the blade edges are resharpened, and when the movable blade 12 is in its lowermost position the leading downwardly inclined cutting edge of this blade will overlap the horizontal adjacent cutting edge of the fixed blade 11 by about $3/32$ of an inch which constitutes the wipe of the shear.

The portable tool is then ready for application to the selected work, and the operator may grasp the handle 9 and actuate the switch 17 with his thumb to operate the motor 14 so as to cause the revolving eccentric 33 to rapidly reciprocate the ram 13 and the movable blade 12 at a speed of approximately 3800 r.p.m. The unit may thereafter be advanced manually along the sheet material while this material rests upon the yoke 10 whereupon the cutting edges of the blades 11, 12 sever the sheet along a straight, arcuate or irregular line as controlled by the operator, by short successive increments. One section of the severed sheet material will remain on top of the yoke 10 while the severed section will follow beneath this yoke, and while the cutting is completed when the sheet of material passes the trailing ends of the relatively inclined cutting edges of the blades, the laterally inclined surface of the movable blade 12 functions to permit easy advancement of the unit along curves and irregular lines and to eliminate burrs from such edges by contacting and advancing along these severed edges, while the downwardly extending lower tip of this movable blade also tends to reduce the drag on the yoke 10. The vertical length of the inclined surface 23 should be greater than the stroke of the movable blade 12 in order to cause this surface to properly cooperate with work pieces of various thicknesses as this extra length and lateral off-setting of the movable blade surface 23 while reciprocating at high speed also facilitates commencement of the cut and eliminates undesirable fouling or stoppage of the tool, so that the formation and cooperation of the blades 11, 12 is extremely important in producing clean cutting especially along irregular lines.

The formation of the ram 13 and of its guiding channel 8 of considerable length and with relatively large polygonal cross-section, positively prevents displacement of the cutting edge of the movable blade 12 relative to vertical plane of the cooperating cutting edge of the fixed blade 11, and also avoids rapid wear and resists twisting tendency when cutting along curved lines. The use of the sliding block 34 which is interposed between the eccentric 33 and the guideway 29 at the upper end of the ram 13 also enhances the bearing surfaces and reduces wear to a minimum, and the extension of the front portion of the handle 9 forwardly toward the path or reciprocation of the ram 13 combined with the location of the yoke 10 closely adjacent to the bottom of the casing 7 facilitates manipulation and provides a compact assemblage.

From the foregoing description of the construction and operation of the improved tool, it should be apparent that the present invention in fact provides a portable power driven shear which is simple, compact and durable in structure while also being highly effective in use and flexible in its adaptations. The unit is operable in any position, and embodies ample bearings to resist excessive wear, while the adjustments of the blades can be accurately effected without the use of shims to produce clean cuts devoid of jagged edges or burrs. Since the blades 11, 12 are relatively movable at very high speed with minimum wipe, rapid and clean shear cuts are produced by successive small increments with least effort and power consumption even when operating on relatively thick material. All of the more delicate parts of the assemblage are well protected while still being readily accessible, and the invention has proven highly satisfactory and successful in actual use to perform diverse types of shearing.

It should be understood that it is not desired to limit the invention to the exact details of construction and operation of the device, herein specifically shown and described since various modifications within the scope of the appended claims may occur to persons skilled in the art.

I claim:

1. In a power shear, a normally fixed blade having a cutting edge disposed in a horizontal plane with the shear in upright position, a rapidly reciprocable blade having a cutting edge inclined toward said plane and extending approximately throughout the length of said fixed blade edge but terminating at its lower end slightly below said plane at the end of its cutting stroke, said reciprocable blade also having a non-cutting lowermost trailing and laterally inclined surface portion projecting downwardly below said plane upon completion of said cutting stroke, and means for rapidly reciprocating said reciprocable blade.

2. In a power shear, a normally fixed blade having a cutting edge disposed in a horizontal plane with the shear in upright position, a rapidly reciprocable blade having a cutting edge inclined toward said plane and extending approximately throughout the length of said fixed blade edge but terminating at its lower end slightly below said plane at the end of its cutting stroke, said reciprocable blade also having thereon a flat upright trailing surface inclined laterally away from the zone of cutting of said blades and projecting below said plane, and means for moving said reciprocable blade relative to said fixed blade to effect cutting of material advancing between the blades.

3. In a power shear, a normally fixed blade having a rectilinear cutting edge disposed in a horizontal plane when the shear is in upright position and which edge terminates at its trailing end in a notch, a rapidly reciprocable blade having a cutting edge inclined toward said plane and extending approximately throughout the length of said fixed blade edge but terminating at its lower end slightly below said notch upon completion of each cutting stroke, said reciprocable blade also having thereon a flat trailing surface inclined laterally away from the vertical plane of cutting of said edges and which surface projects below said horizontal plane upon completion of each cutting stroke, and means for reciprocating said reciprocable blade.

References Cited in the file of this patent

UNITED STATES PATENTS

| | | |
|---|---|---|
| 1,922,846 | Gray | Aug. 15, 1933 |
| 2,125,556 | Gleich | Aug. 2, 1938 |
| 2,226,241 | Gray | Dec. 24, 1940 |
| 2,244,638 | Boardman | June 3, 1941 |
| 2,256,779 | McHenry | Sept. 23, 1941 |
| 2,278,311 | Gray | Mar. 31, 1942 |
| 2,454,728 | White | Nov. 23, 1948 |
| 2,482,582 | Grafe | Sept. 20, 1949 |
| 2,631,370 | Gray | Mar. 17, 1953 |